United States Patent
Chen

(10) Patent No.: US 6,558,044 B1
(45) Date of Patent: May 6, 2003

(54) OPTICAL FIBER INNER TUBE CONNECTOR

(75) Inventor: Chung-Fang Chen, Anaheim, CA (US)

(73) Assignee: Global Pacific Group Ltd., Tortola (VG)

( * ) Notice: Subject to any disclaimer, the term of this patent is extended or adjusted under 35 U.S.C. 154(b) by 0 days.

(21) Appl. No.: 09/510,482

(22) Filed: Feb. 23, 2000

(51) Int. Cl.[7] .................................................. G02B 6/38
(52) U.S. Cl. ............................. 385/70; 385/72; 385/62; 385/81
(58) Field of Search ............................. 385/70, 72, 62, 385/66, 68, 81, 84, 87

(56) References Cited

U.S. PATENT DOCUMENTS

| | | | | |
|---|---|---|---|---|
| 5,048,921 A | * | 9/1991 | Jones et al. | 385/69 |
| 5,115,484 A | * | 5/1992 | Johnson | 385/72 |
| 5,217,808 A | * | 6/1993 | Cobb | 428/392 |
| 5,239,602 A | * | 8/1993 | Hundsberger et al. | 385/62 |

\* cited by examiner

*Primary Examiner*—Ellen E. Kim
(74) *Attorney, Agent, or Firm*—Lowe Hauptman Gilman & Berner, LLP

(57) ABSTRACT

A simple optical fiber inner tube connector mainly includes a tubular body being divided into two receiving chambers by at least an annular rib in the tubular body. Each of the receiving chambers is provided around its inner wall surface with a spirally extended thread and at least an engaging tooth located between the annular rib and an inner end of the spiral thread. When two optical fiber inner tubes are to be connected to each other by means of the connector, they are separately screwed into the two receiving chambers so that the engaging teeth tightly engage into outer wall surfaces of the two optical fiber inner tubes for them to accurately align with each other and firmly locate in the connector. Waterstop sleeve members made of elastically deformable material may be put around outer wall surface of the tubular body near two ends thereof to fitly and tightly cover the joint of the connector and the optical fiber inner tubes and to align the inner tubes with the tubular body.

21 Claims, 13 Drawing Sheets

OPTICAL FIBER INNER TUBE CONNECTOR

FIELD OF THE INVENTION

The present invention relates to a simple optical fiber inner tube connector, and more particularly to an optical fiber inner tube connector that is internally threaded for two optical fiber inner tubes to screw into two ends of the connector and externally provided at two ends with sealing elements to seal two ends of the connector in an airtight manner.

BACKGROUND OF THE INVENTION

The optical fiber cable is an advanced transmission material for communication line. The optical fiber cable effectively isolates the transmitted signals from noise interference by the electromagnetic wave. The optical fiber cable also has the advantages of high band width and good ability of overcoming the problem of lose of signal and is therefore a good substitute for conventional copper coaxial cable and electric cable. With the optical fiber cable, better signal transmission effect may be achieved over the high-speed telecommunication network.

However, due to its fragility, the optical fiber cable requires more strict external protection than the conventional copper cables. Usually, the optical cable includes an outer tube in which three or four inner tubes with smaller diameter than that of the outer tube are received. Each of the inner tubes has an optical fiber extending therethrough. In other words, each optical fiber cable includes at least two layers of protection separately provided by the outer and the inner tubes. The outer and the inner tubes are basically made of plastic material. Generally, the outer tube is made of hard and wear-resistant plastic material, such as polyvinyl chloride, and the inner tube is made of softer plastic material, such as polyethylene or other plastic material having similar physical property.

In practical installation of the optical fiber cable, the outer tube is first embedded under ground. Thereafter the inner tubes are put into the outer tube. As being limited by the available length of the inner tube and different extending directions of the optical fiber cable, a plurality of segments of the inner tube must be used and connected segment by segment to complete the primary embedding of the optical fiber cable line. Finally, an optical fiber is inserted through each of the inner tubes by means of compressed air. The compressed air brings the optical fiber from one end of the inner tube to the opposite end thereof. To effectively make use of the compressed air in moving the optical fiber through the inner tube, the inner tube must be excellently airtight through the whole length thereof. Therefore, the air-tightness of the inner tube at its connections between two adjacent segments thereof is absolutely required.

In addition to the air-tightness, it is also necessary to actually prevent moisture, insects and other foreign materials from entering into the inner tube via the connections between two segments.

Moreover, in order to provide the connection between the inner tube segments with a sufficient strength to resist unwanted separation of the inner segments from one another, the inner tube segments have to be securely and firmly connected to one another in order to resist any pull or push force applied thereto by the compressed air during installing the optical fiber cable.

To achieve the aforesaid requirement of air-tightness, the currently available conventional connectors for connecting two inner tube segments to each other usually include numerous complicate components and are therefore difficult to handle at the work field. In connecting two inner tube segments to each other, an optical fiber inner tube connector is needed. For an inner tube segment to readily connect to the inner tube connector, a radial clearance is usually provided between the connector and the inner tube segment. However, such radial clearance tends to cause separation of the inner tube segment from the connector due to pull or push force applied on the inner tube segment during work. Moreover, such radial clearance may also cause improper axial alignment between two inner tube segments connected to two ends of the connector. The segments may be radially offset with respect to each other and causes problems in moving the optical fiber through the inner tubes.

U.S. Pat. No. 5,832,158 entitled "Optical Fiber Inner Tube Connector" granted to the applicant and U.S. patent application Ser. No. 09/109,007 entitled "Optic Fiber Inner Tube Connector" filed by the applicant on Jul. 1, 1998 both disclose optical fiber inner tube connectors that are effective in solving the problems existed in the conventional optical fiber inner tube connectors. These connectors are, however, structurally complicate and do not ensure an absolutely trouble-free connection of optical fiber inner tubes to one another.

SUMMARY OF THE INVENTION

A primary object of the present invention is to provide a simple optical fiber inner tube connector that enables most convenient connection of two optical fiber inner tubes to one another in the airtight manner.

Another object of the present invention is to provide a simple optical fiber inner tube connector that ensures absolutely sealed connection of two optical fiber inner tubes to effectively prevent moisture, insect and other foreign materials from entering into the inner tubes.

A further object of the present invention is to provide a simple optical fiber inner tube connector that ensures firm connection of two optical fiber inner tubes to one another so that the two inner tubes would not be easily pulled or pushed apart from one another during the installation of the optical fiber cable.

A still further object of the present invention is to provide a simple optical fiber inner tube connector that automatically guides two optical fiber inner tubes to be connected thereto to axially align with each other without being offset relative to each other, and therefore facilitates accurate connection of the inner tubes and subsequent smooth extending of the optical fiber through the connected inner tubes.

To achieve the above and other objects, the simple optical fiber inner tube connector of the present invention mainly includes a tubular body being divided into two receiving chambers by at least an annular rib in the tubular body. Each of the receiving chambers is provided around its inner wall surface with a spirally extended thread and at least an engaging tooth located between the annular rib and an inner end of the spiral thread. When two optical fiber inner tubes are to be connected to each other by means of the connector, they are separately screwed into the two receiving chambers so that the engaging teeth tightly engage into outer wall surfaces of the two optical fiber inner tubes for them to accurately align with each other and firmly locate in the connector. Waterstop sleeve members made of elastically deformable material may be put around outer wall surface of the tubular body near two ends thereof to fitly and tightly cover the joint of the connector and the optical fiber inner tubes and to align center lines of the inner tubes with that of the tubular body.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
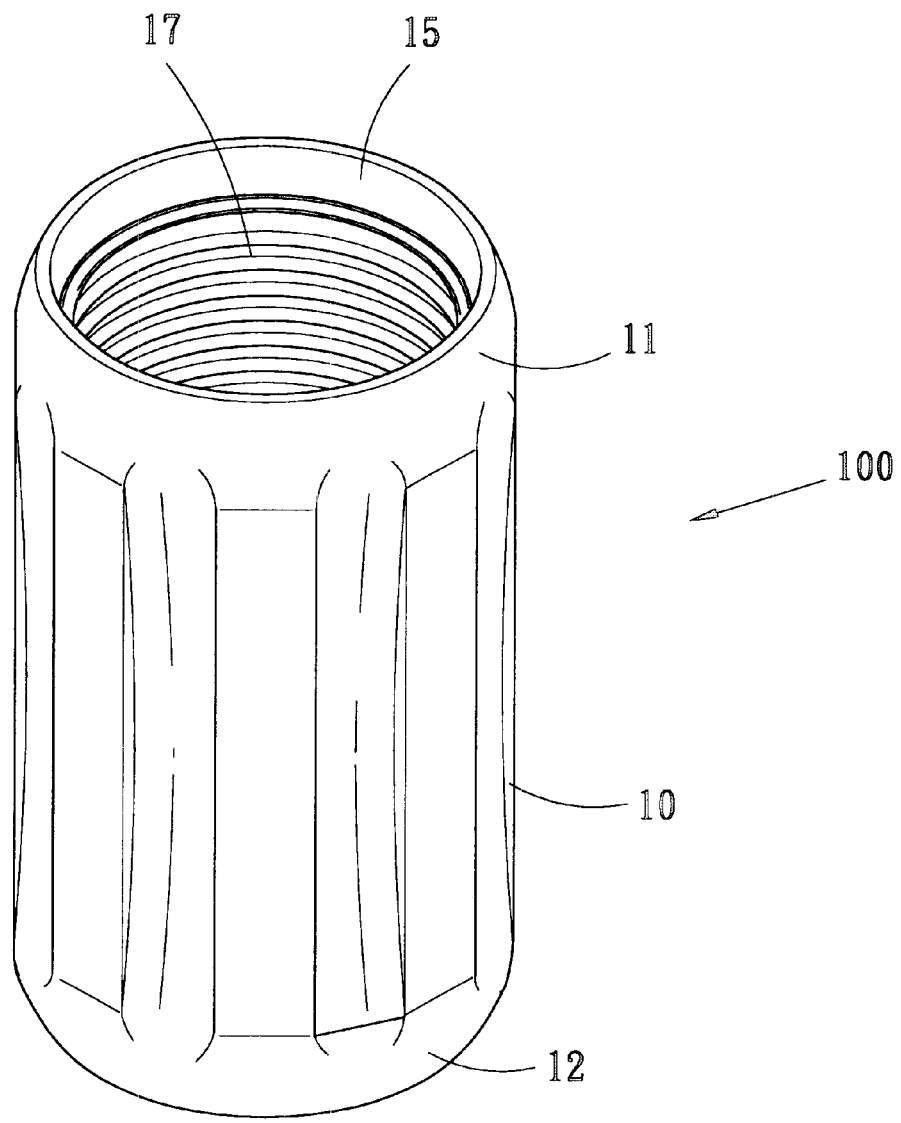
FIG. 1 is a perspective of a simple optical fiber inner tube connector according to a first embodiment of the present invention.
Figure 2:
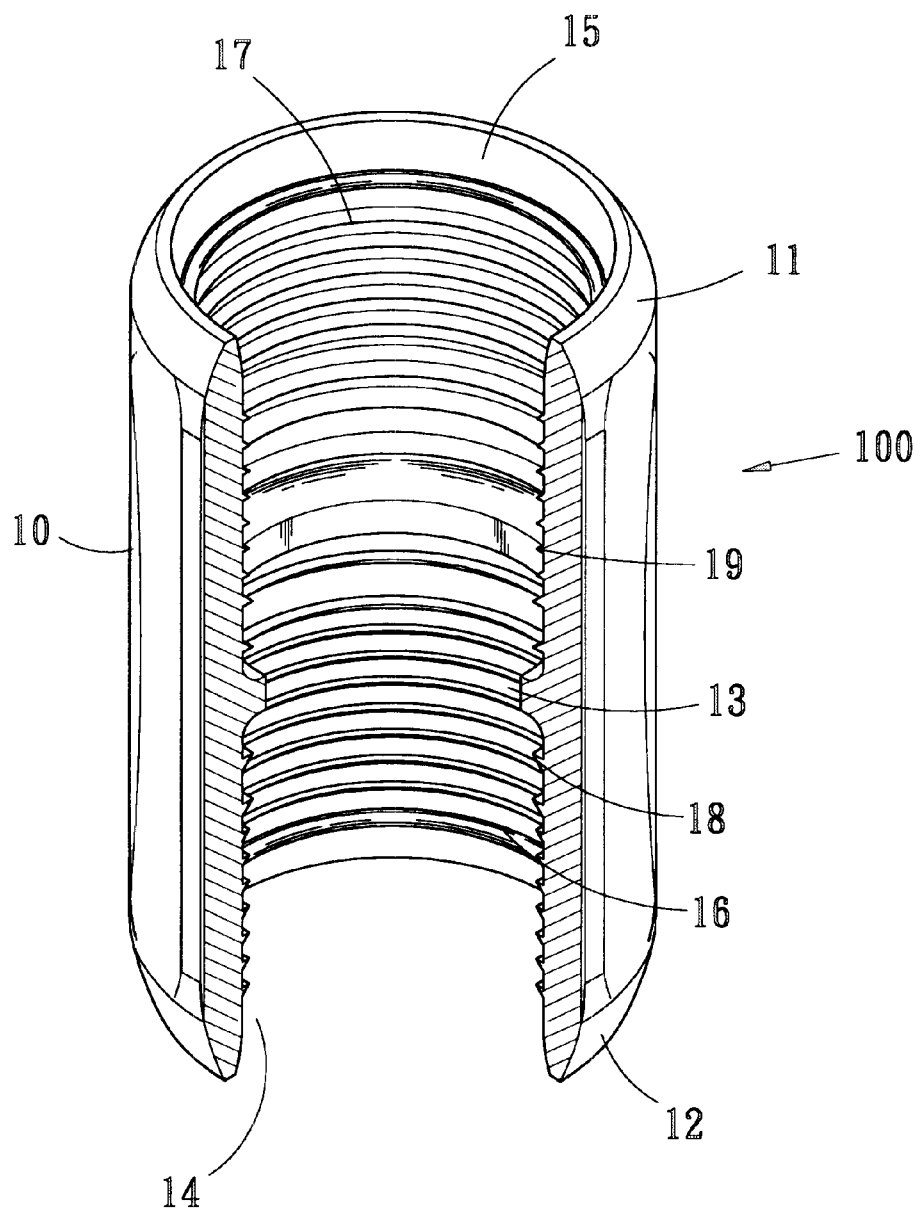
FIG. 2 is a partially cutaway perspective of the simple optical fiber inner tube connector of FIG. 1 to show internal structure thereof.
Figure 3:
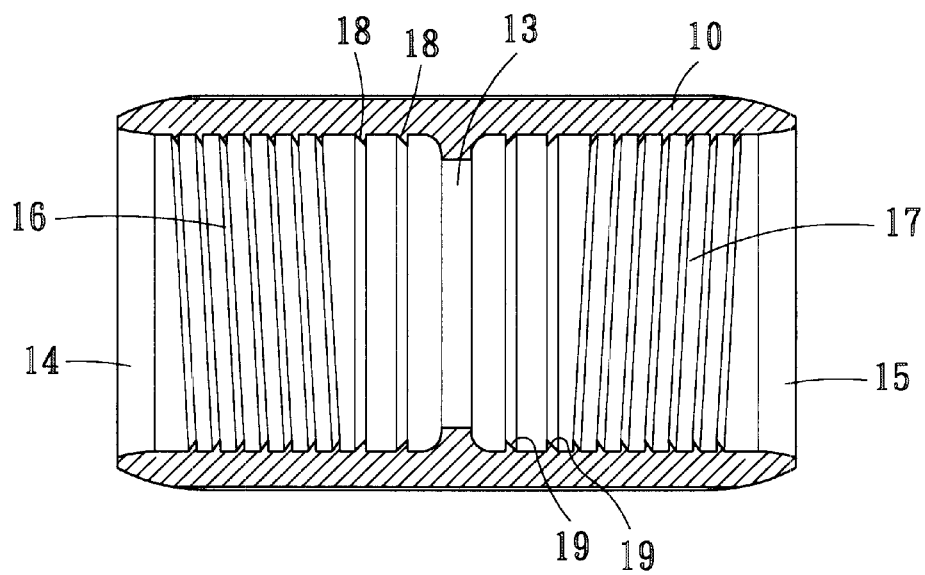
FIG. 3 is an axially sectional view of the simple optical fiber inner tube connector of FIG. 1.

Please refer to FIGS. 1 to 3 in which an optical fiber inner tube connector 100 according to a first embodiment of the present invention is shown. For the purpose of simplicity, the optical fiber inner tube connector 100 will be referred to as the "connector" 100 hereinafter. As shown, the connector 100 includes a tubular body 10 of any shape. The tubular body 10 may be made of clear or opaque polyvinyl chloride (PVC) material through integral injection molding. An outer diameter of the tubular body 10 is gradually reduced toward two ends thereof to form two tapered outer peripheral surfaces 11 and 12. The tubular body 10 is provided around an inner wall surface with at least a rib 13 to divide an inner space defined by the tubular body 10 into two receiving chambers 14 and 15.

When the tubular body 10 is injection molded, threads 16 and 17 are separately formed around inner wall surfaces of the receiving chambers 14 and 15, respectively. The threads 16 and 17 may have the same or different directions of spiral. In the illustrated embodiments of the present invention, the threads 16 and 17 spiral in opposite directions so that two optical fiber inner tubes connected thereto could be tightened or loosened at the same time. The threads 16 and 17 do not extend the full length of the inner wall surface of the receiving chambers 14 and 15. The receiving chambers 14 and 15 are provided around their respective inner end, that is, at the end of the threads 16 and 17, each with at least an engaging tooth 18 and 19. The engaging teeth 18 and 19 are formed on the injection molded tubular body 10 by lathing. One side of the engaging teeth 18, 19 facing toward two ends of the tubular body 10 are inclined surfaces that facilitates the insertion of the optical fiber inner tubes into the connector 100 via two ends thereof. The engaging teeth 18, 19 are not helical teeth and have pitch and depth larger than that of the threads 16 and 17.

Figure 4:
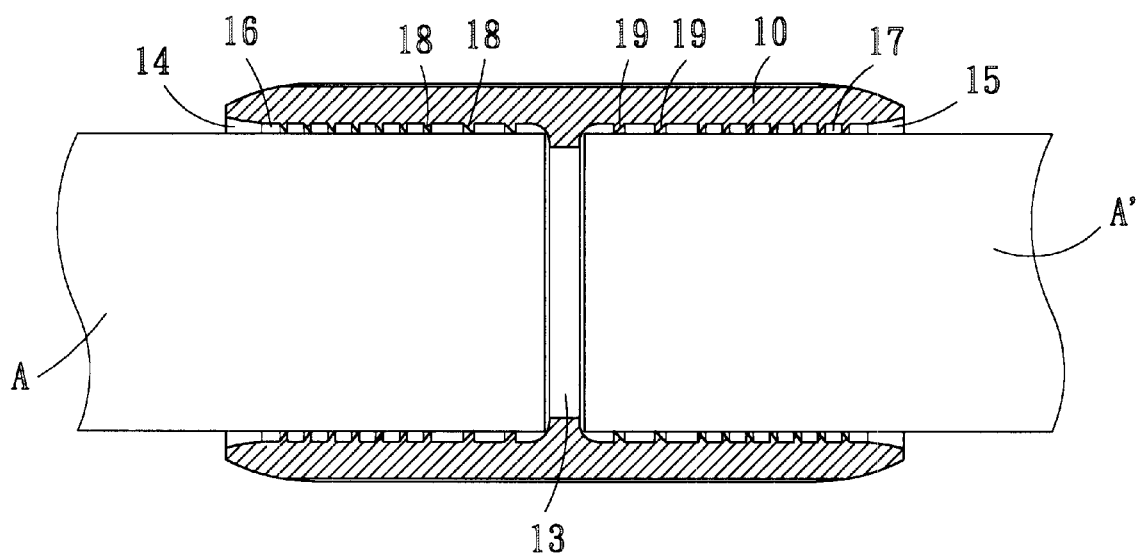
FIG. 4 shows two optical fiber inner tubes are screwed into the simple optical fiber inner tube connector of FIG. 1 via two ends thereof.

Please now refer to FIG. 4 that shows two optical fiber inner tubes A and A' are connected to two ends of the tubular body 10 of the connector 100 shown in FIG. 1. The optical fiber inner tubes A, A' are screwed at one end into the receiving chambers 14 and 15 to firmly engage with the threads 16, 17. Due to the firm engagement of the threads 16 and 17 with outer wall surfaces of the optical fiber inner tubes A, A', respectively, the optical fiber inner tubes A, A' are firmly connected to and received in the receiving chambers 14 and 15, respectively.

When the optical fiber inner tubes A and A' are fully screwed into the receiving chambers 14 and 15, outer wall surfaces of the inner ends of the optical fiber inner tubes A, A' firmly engage with the engaging teeth 18, 19 to further ensure a tight location of the optical fiber inner tubes A and A' in the receiving chambers 14, 15. That is, the optical fiber inner tubes A and A' would not easily separate from the connector 100 due to any pull or push force applied on the inner tubes A, A'. Moreover, the threads 16, 17 naturally, automatically and accurately guide the optical fiber tubes A and A' to align their center lines with that of the tubular body 10 and thereby ensure a precise connection and alignment of the two optical fiber inner tubes A and A' to and with each other via the connector 100. The two optical fiber inner tubes A and A' are therefore connected to one another in an airtight and completely sealed manner without any clearance left between them. And, the two inner tubes A and A' are located in the two receiving chambers 14, 15 of the tubular body 10 simply by screwing them into the tubular body 10 without the need of a number of complicate components and procedures.

Figures 5, 6:
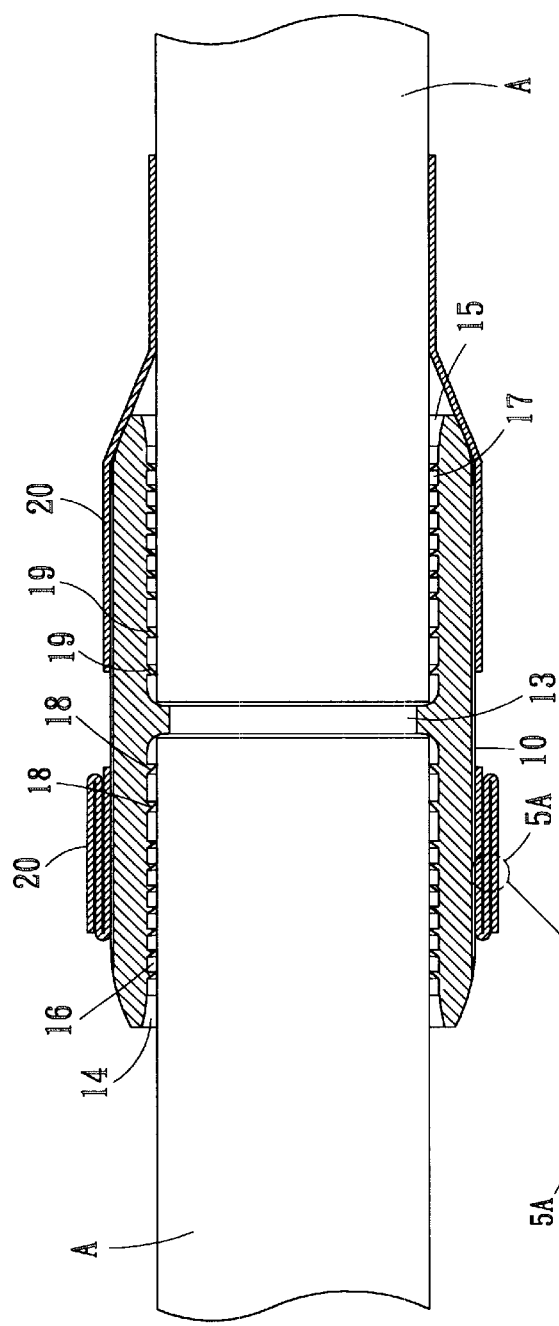
FIG. 5 shows two ends of the simple optical fiber inner tube connector of FIG. 4 having two optical fiber inner tubes connected thereto are further externally covered with waterstop sleeve members.
FIG. 6 is an enlarged view of the circled portion labeled 5A in FIG. 5.

FIG. 5 shows the connector 100 of FIG. 1 having two optical fiber inner tubes A and A' connected to two ends thereof. Two waterstop sleeve members 20 made of elastically deformable material, such as rubber, are separately put around outer wall surface of the tubular body 10 near two ends thereof. The waterstop sleeve members 20 are used to elastically and tightly cover joint lines of the connector 100 and the inner tubes A, A'. Before the waterstop sleeve members 20 are used to cover the joint lines of the connector 100 and the inner tubes A and A', they are folded into several layers 21, 22 and 23 around the ends of the connector 100. FIG. 6 is an enlarged sectional view of the circled portion labeled 5A in FIG. 5 to show the folded waterstop member 20. Clearances X1 and X2 are separately formed between the layers 21 and 22 and the layers 22 and 23. Lubricant, such as talc powder, is applied in the clearances X1 and X2 to allow smooth stretching of the waterstop sleeve members 20 from the folded state to fitly and tightly cover two ends of the tubular body 10. When stretching the folded waterstop member 20, simply apply a push force on the outermost layer 21 of the folded waterstop member 20 to move it toward the tapered outer peripheral surface 11, 12 of the tubular body 10, so that the waterstop member 20 stretches and elastically deforms to tightly cover and seal the joint line between the end of the tubular body 10 and the optical fiber inner tube A, A' and ensure the connection between the two optical fiber inner tubes A and A' is sealed and airtight.

Figure 7:
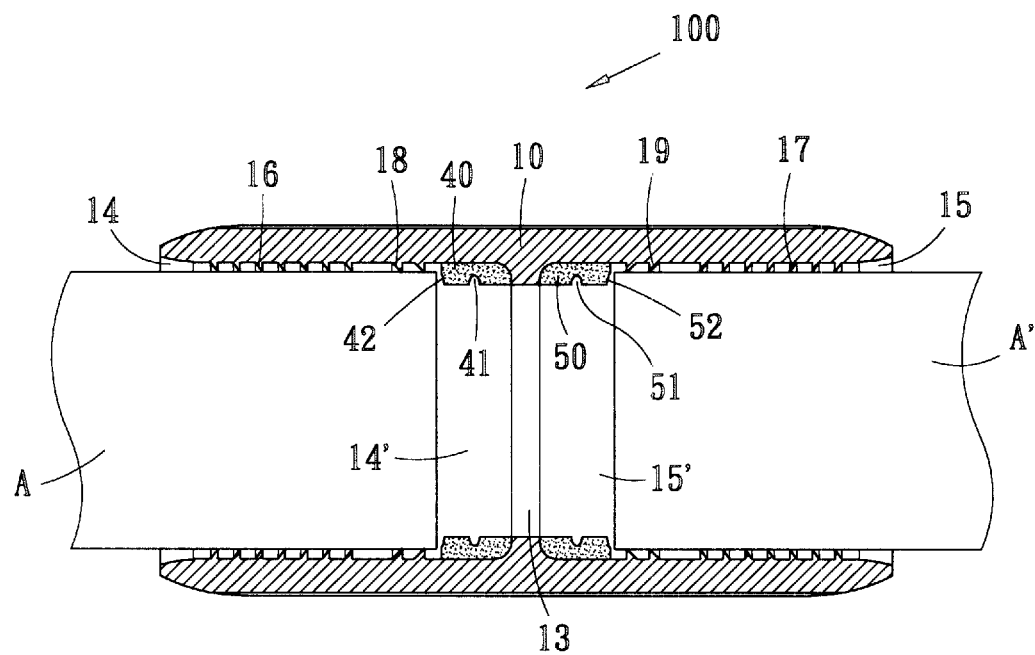
FIG. 7 shows the simple optical fiber inner tube connector of FIG. 4 having two optical fiber inner tubes connected thereto is further internally provided with waterstop locating rings.
Figure 8:
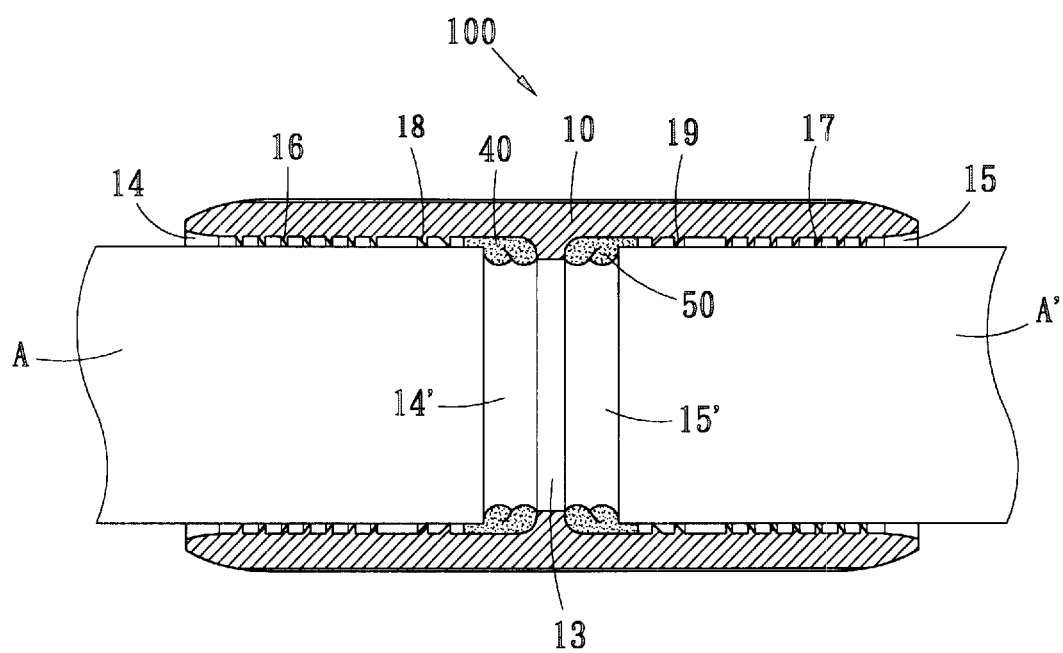
FIG. 8 is similar to FIG. 7 but with the two optical fiber inner tubes screwed further into the connector, causing the waterstop locating rings to elastically deform and thereby hold the optical fiber inner tubes in place.

FIG. 7 illustrates another tubular body 10 of the connector 100 that is similar to the tubular body 10 shown in FIGS. 1 to 4 but has at least two waterstop locating rings 40 and 50 provided, around inner wall surfaces 14' and 15' of the tubular body 10 that are separately located between the annular rib 13 and the inner ends of the two receiving chambers 14 and 15. The waterstop locating rings 40, 50 are made of a material having an adequate flexibility and are provided along their respective inner peripheral surface with an annular groove 41, 51, so that the waterstop locating rings 40, 50 are more easily elastically deformable. One side of each the waterstop locating ring 40, 50 facing toward the end of the tubular body 10 is a radially inward inclined surface 42, 52. When the two optical fiber inner tubes A, A' are fully screwed into the tubular body 10 with their inner ends pressing against the inclined surfaces 42, 52 of the waterstop locating rings 40 and 50, the inclined surfaces 42, 52 are compressed and form very good means to guide the two optical fiber inner tubes A, A' to center and therefore align with each other in the tubular body 10, as shown in FIG. 8. The compressed inclined surfaces 42, 52 of the waterstop locating rings 40, 50 further ensure excellently airtight and watertight connection between the two optical fiber inner tubes A, A'. The two annular grooves 41, 51 on the two waterstop locating rings 40, 50 are helpful in the axial compression and elastic deformation of the inclined surfaces 42, 52 and of the whole waterstop locating rings 40, 50, so that the two waterstop locating rings 40, 50 effectively guide the two optical fiber inner tubes A, A' to align their center lines with the center line of the tubular body 10. That is, the two optical fiber inner tubes A, A' could be more accurately connected to one another without leaving unwanted clearance between them to admit air and water into the inner tubes via their connection.

Figure 9:
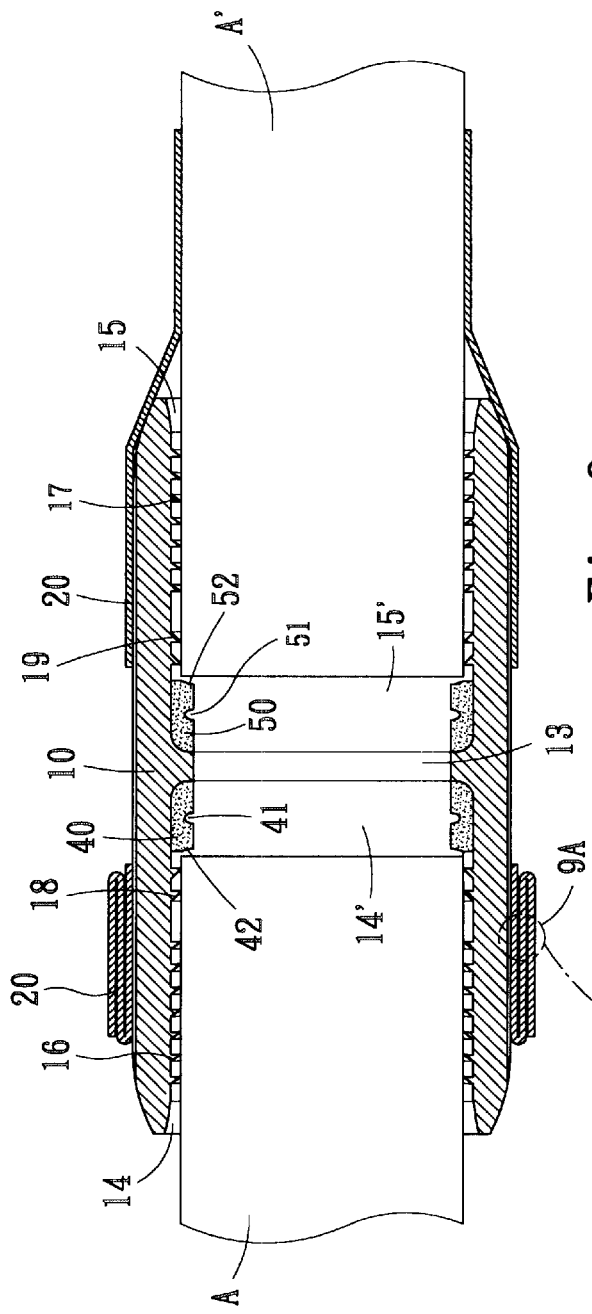
FIG. 9 shows the simple optical fiber inner tube connector of FIG. 4 having two optical fiber inner tubes connected thereto is externally covered at two ends with waterstop sleeve members and internally provided with waterstop locating rings.
Figure 10:
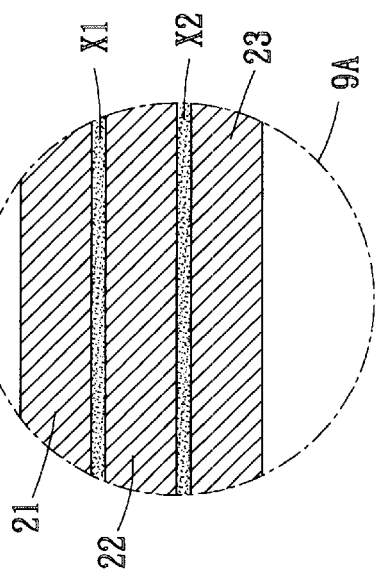
FIG. 10 is an enlarged view of the circled portion labeled 9A in FIG. 9.
Figure 11:
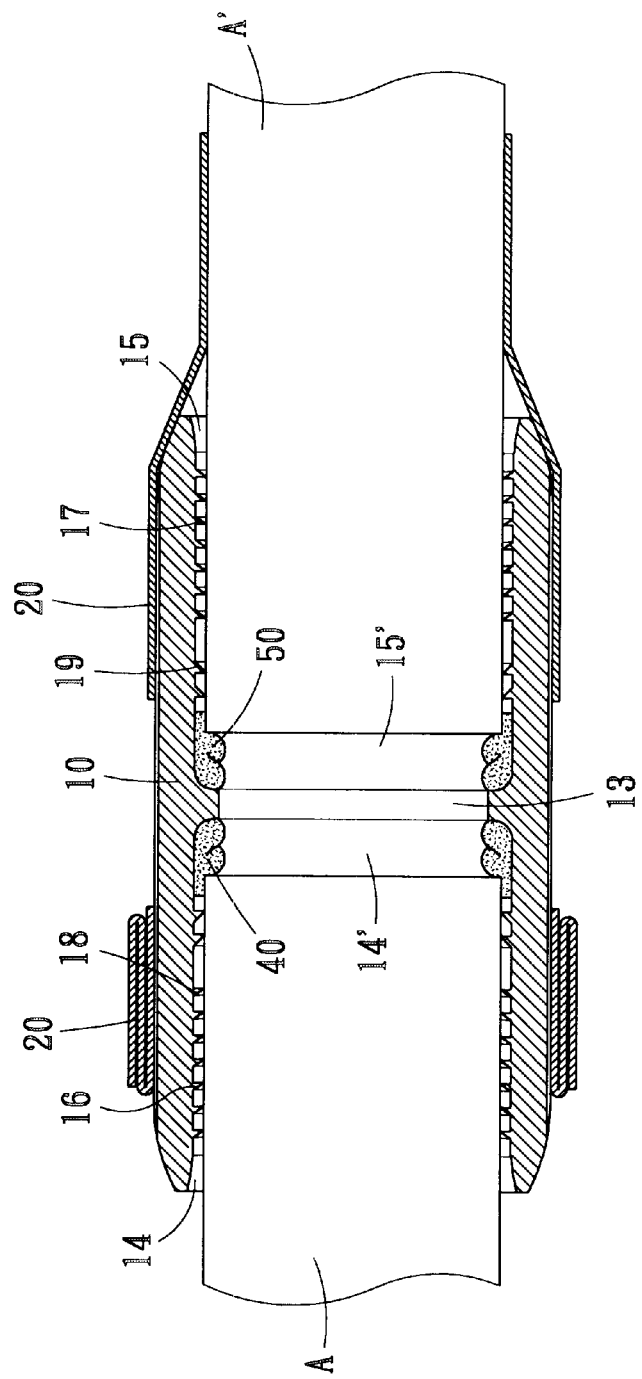
FIG. 11 is similar to FIG. 9 but with the two optical fiber inner tubes screwed further into the connector, causing the waterstop locating rings to elastically deform and thereby hold the optical fiber inner tubes in place.

FIGS. 9 to 11 illustrates another tubular body 10 of the connector 100 that is similar to the tubular body 10 shown in FIGS. 1 to 4 but is externally covered at two ends with two waterstop sleeve members 20 and internally provided with two waterstop locating rings 40, 50. As in the case of the connector 100 of FIG. 5, a push force may be applied on the outermost layer 21 of each folded waterstop member 20 to move it toward the tapered outer peripheral surface 11, 12 of the tubular body 10, so that the waterstop member 20 stretches and elastically deforms to tightly cover and seal the joint line between the end of the tubular body 10 and the optical fiber inner tube A, A' and ensures the connection between the two optical fiber inner tubes A and A' is sealed and airtight. Meanwhile, as in the case of the connector 100 of FIG. 7, the two waterstop locating rings 40, 50 effectively guide the two optical fiber inner tubes A, A' to align their center lines with the center line of the tubular body 10, so that the two optical fiber inner tubes A, A' could be more accurately connected to one another without leaving unwanted clearance between them to admit air and water into the inner tubes via their connection.

Figure 12:
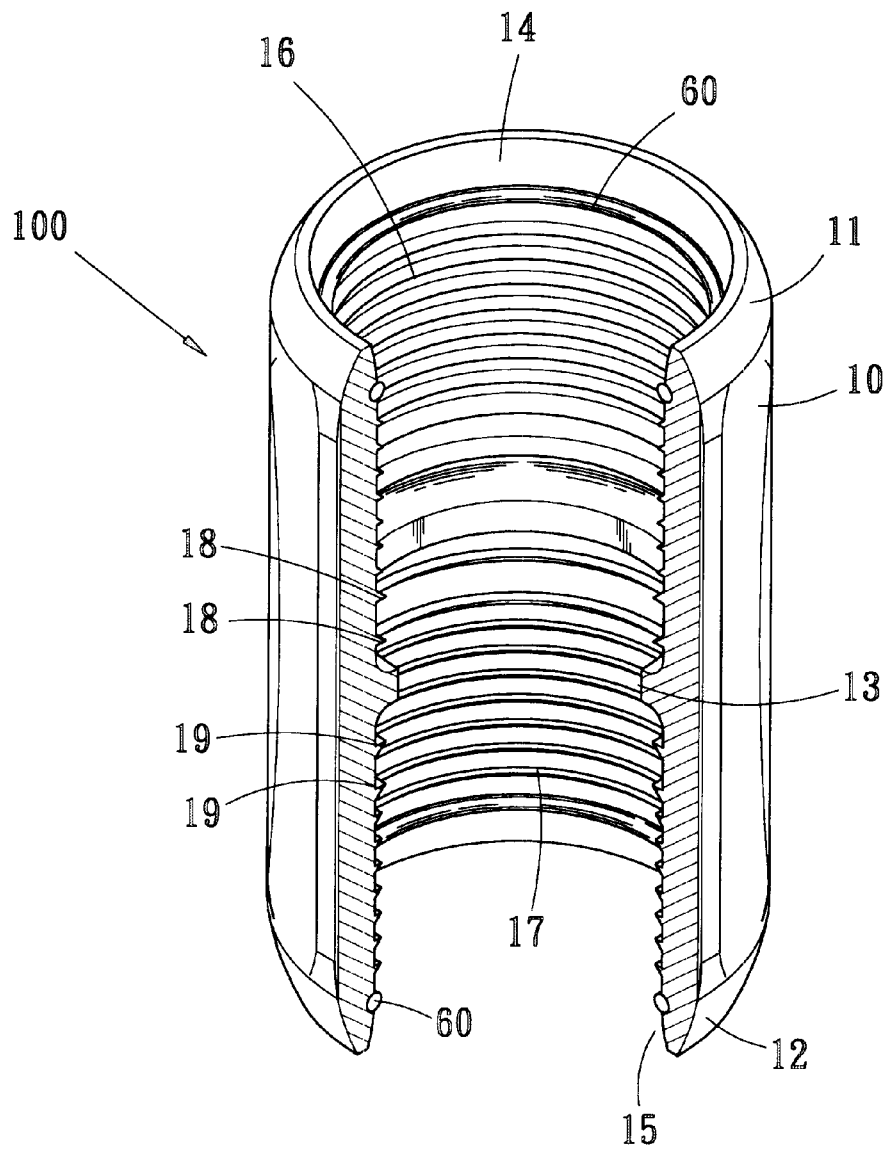
FIG. 12 is a partially cutaway perspective of a simple optical fiber inner tube connector according to a second embodiment of the present invention, wherein the connector is internally provided near each end with a waterstop seal ring.
Figure 13:
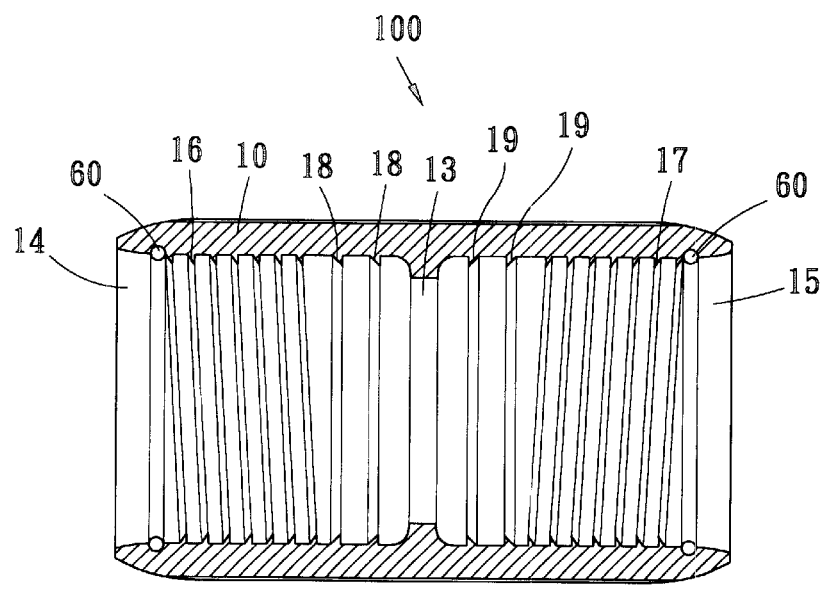
FIG. 13 is an axially sectional view of the simple optical fiber inner tube connector of FIG. 12.
Figure 14:
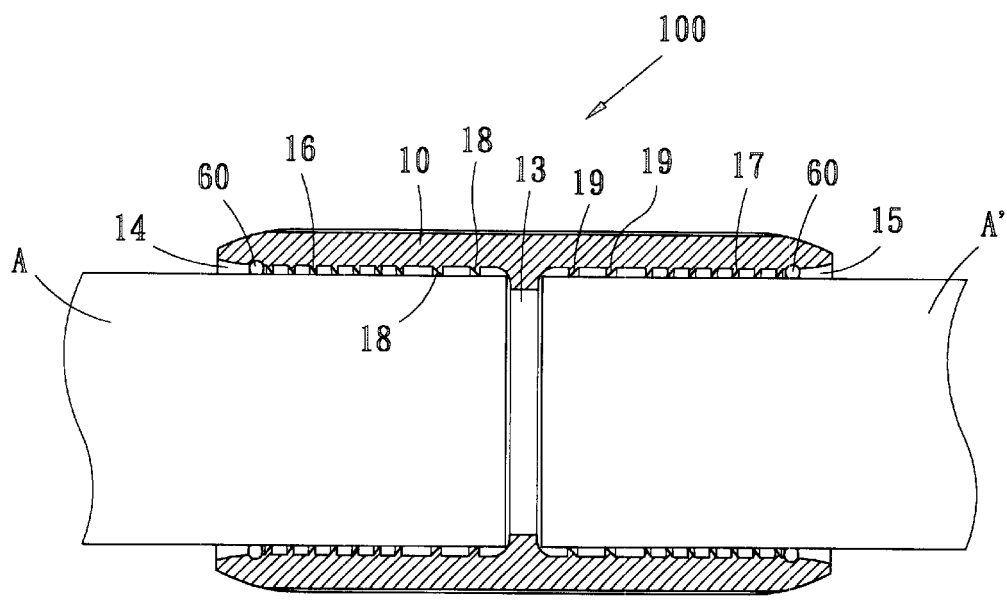
FIG. 14 shows two optical fiber inner tubes are screwed into the simple optical fiber inner tube connector of FIG. 12 via two ends thereof.

FIGS. 12 to 14 illustrate another connector 100 according to a second embodiment of the present invention. The connector 100 in this embodiment is similar to the connector 100 of FIGS. 1 to 3, except that it is provided around the inner wall surfaces of the receiving chambers 14, 15 near the two ends of the tubular body 10 each with at least one waterstop seal ring 60. When the two optical fiber inner tubes A, A' are screwed into the two ends of the tubular body 10, as shown in FIG. 14, the waterstop seal rings 60 would tightly contact with outer wall surfaces of the two optical fiber inner tubes A, A' to effectively prevent liquid, insect or other foreign material from entering into the tubular body 10 via the outer ends of the receiving chambers 14, 15 while further ensure that the connector 100 is sealed to provide an airtight tubular body 10.

Figure 15:
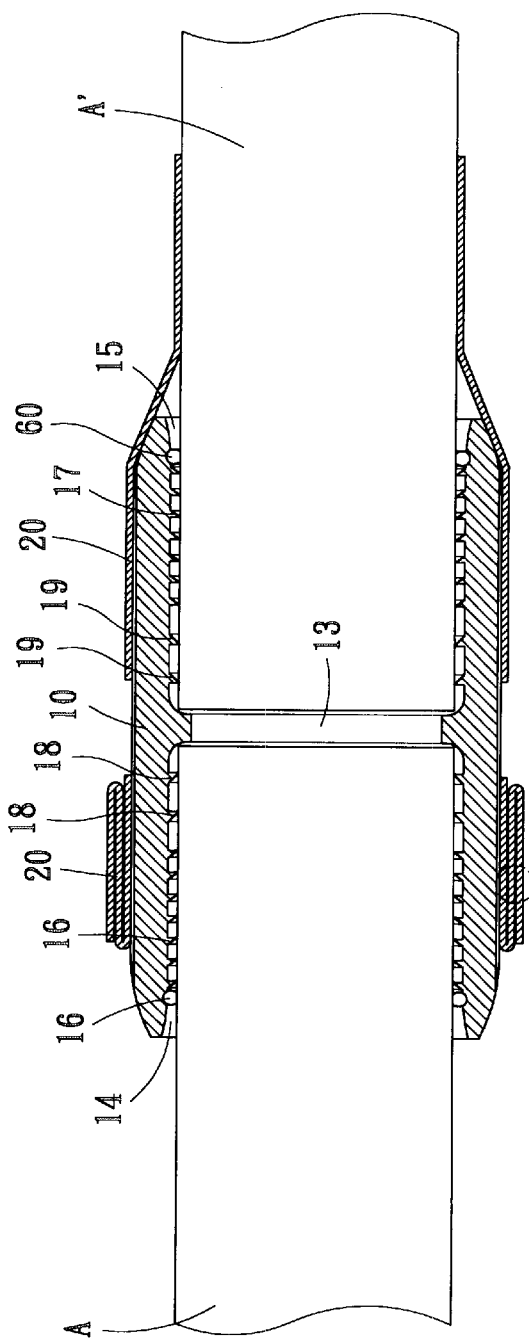
FIG. 15 shows two ends of the simple optical fiber inner tube connector of FIG. 14 having two optical fiber inner tubes connected thereto are further externally covered with waterstop sleeve members.
Figure 16:
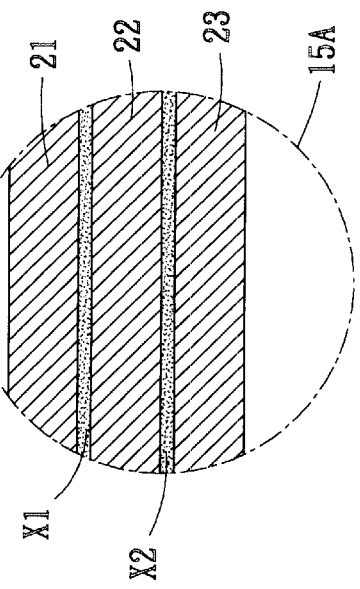
FIG. 16 is an enlarged view of the circled portion labeled 15A in FIG. 15.

FIGS. 15 and 16 illustrate another connector 100 of FIG. 12 that has two waterstop sleeve members 20 put around the outer wall surfaces of the tubular body 10 near two ends thereof. As in the case of the connector 100 of FIG. 5, a push force may be applied on the outermost layer 21 of each folded waterstop member 20 to move it toward the tapered outer peripheral' surface 11, 12 of the tubular body 10, so that the waterstop member 20 stretches and elastically deforms to tightly cover and seal the joint line between the end of the tubular body 10 and the optical fiber inner tube A, A' and ensures the connection between the two optical fiber inner tubes A and A' is sealed and airtight. Meanwhile, the waterstop seal rings 60 would tightly contact with outer wall surfaces of the two optical fiber inner tubes A, A' to effectively prevent liquid, insect or other foreign material from entering into the tubular body 10 via the outer ends of the receiving chambers 14, 15.

Figure 17:
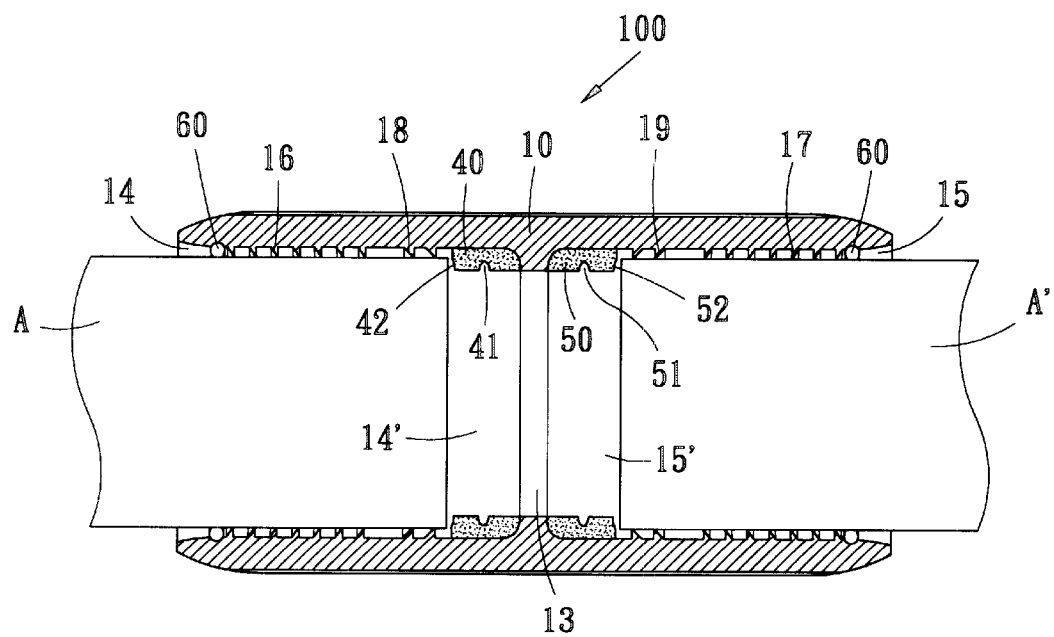
FIG. 17 shows the simple optical fiber inner tube connector of FIG. 14 having two optical fiber inner tubes connected thereto is further internally provided with waterstop locating rings.
Figure 18:
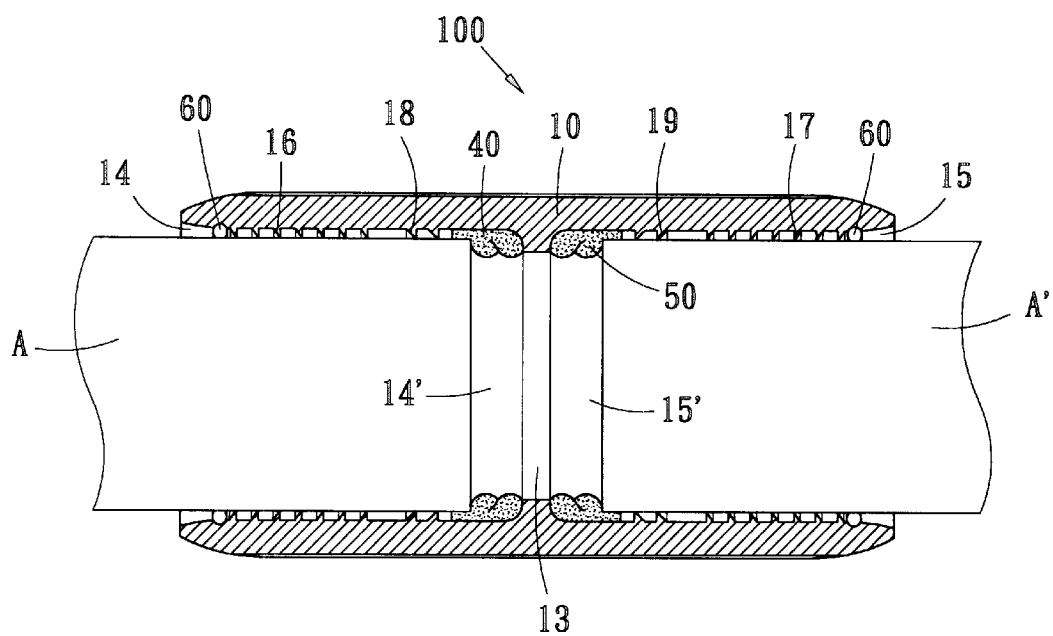
FIG. 18 is similar to FIG. 17 but with the two optical fiber inner tubes screwed further into the connector, causing the waterstop locating rings to elastically deform and thereby hold the optical fiber inner tubes in place.

FIGS. 17 and 18 illustrate another connector 100 of FIG. 12 that has at least two waterstop locating rings 40 and 50 provided around inner wall surfaces 14' and 15' of the tubular body 10 that are separately located between the annular rib 13 and the inner ends of the two receiving chambers 14 and 15, as in the case of the connector 100 of FIG. 7. When the two optical fiber inner tubes A, A' are fully screwed into the tubular body 10 with their inner ends pressing against the inclined surfaces 42, 52 of the waterstop locating rings 40 and 50, the inclined surfaces 42, 52 and the annular grooves 41, 51 are compressed and deformed to form very good means to guide the two optical fiber inner tubes A, A' to center and therefore align with each other in the tubular body 10, as shown in FIG. 18. Meanwhile, the waterstop seal rings 60 would tightly contact with outer wall surfaces of the two optical fiber inner tubes A, A' to effectively prevent liquid, insect or other foreign material from entering into the tubular body 10 via the outer ends of the receiving chambers 14, 15.

Figure 19:
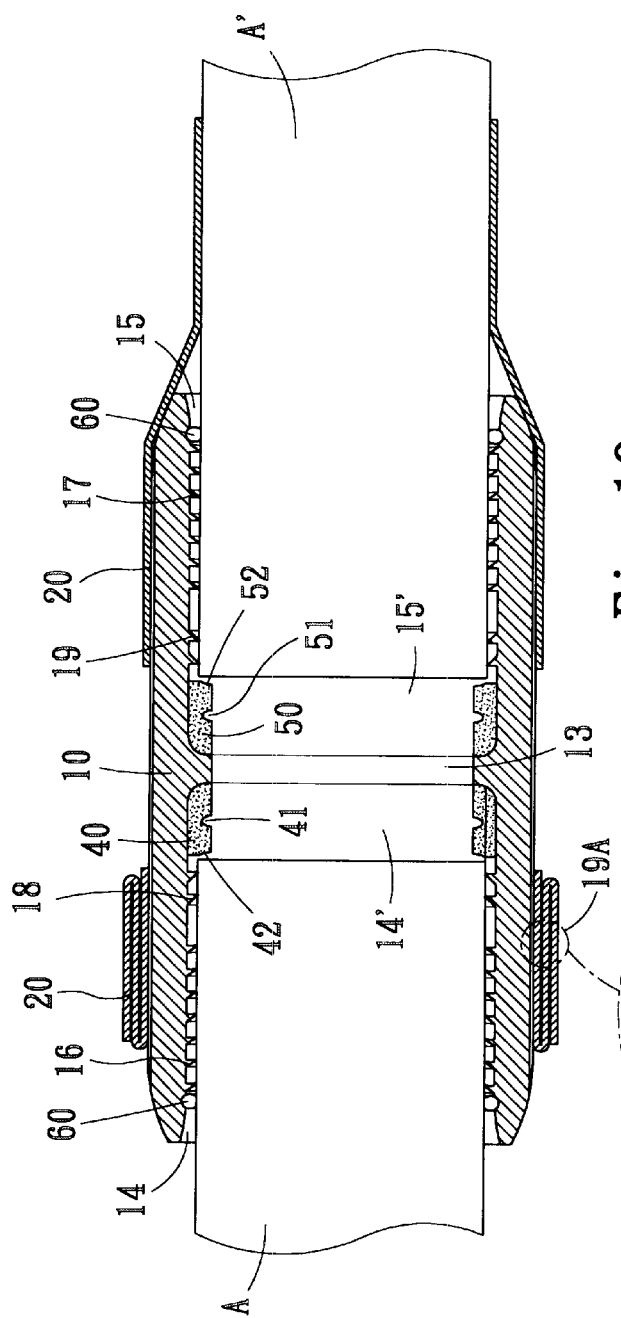
FIG. 19 shows the simple optical fiber inner tube connector of FIG. 14 having two optical fiber inner tubes connected thereto is externally covered at two ends with waterstop sleeve members and internally provided with waterstop locating rings.
Figure 20:
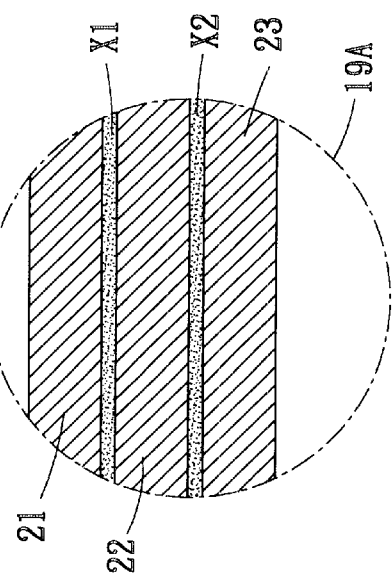
FIG. 20 is an enlarged view of the circled portion labeled 19A in FIG. 19.
Figure 21:
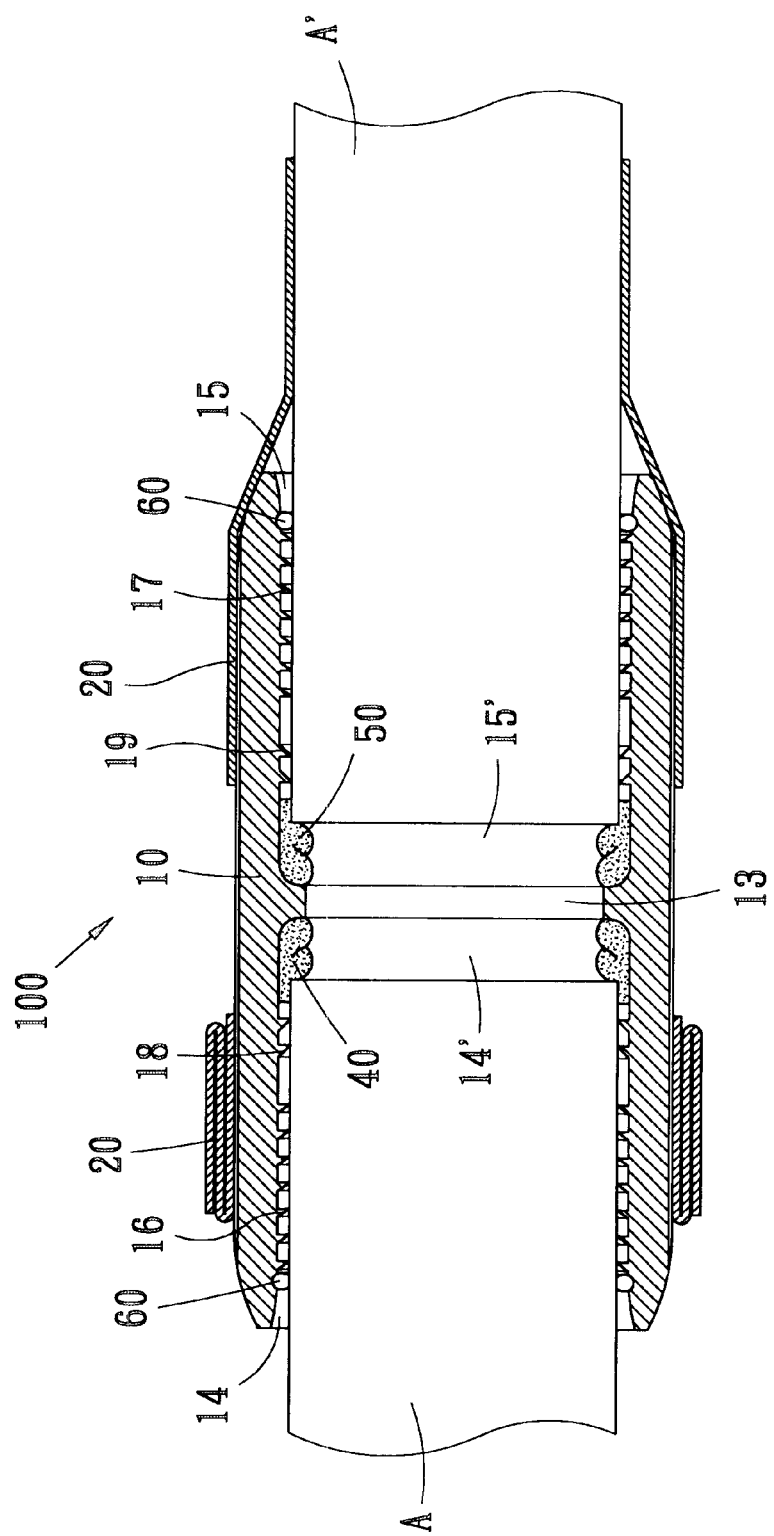
FIG. 21 is similar to FIG. 19 but with the two optical fiber inner tubes screwed further into the connector, causing the waterstop locating rings to elastically deform and thereby hold the optical fiber inner tubes in place.

FIGS. 19 to 21 show another connector 100 of FIG. 12 that is externally covered at two ends with two waterstop sleeve members 20 and internally provided with two waterstop locating rings 40, 50. As in the case of the connector 100 of FIG. 5, a push force may be applied on the outermost layer 21 of each folded waterstop member 20 to move it toward the tapered outer peripheral surface 11, 12 of the tubular body 10, so that the waterstop member 20 stretches and elastically deforms to tightly cover and seal the joint line between the end of the tubular body 10 and the optical fiber inner tube A, A' and ensures the connection between the two optical fiber inner tubes A and A' is sealed and airtight. Meanwhile, as in the case of the connector 100 of FIG. 7, the two waterstop locating rings 40, 50 effectively guide the two optical fiber inner tubes A, A' to align their center lines with the center line of the tubular body 10, so that the two optical fiber inner tubes A, A' could be more accurately connected to one another without leaving unwanted clearance between them to admit air and water into the inner tubes via their connection.

Moreover, the waterstop: seal rings 60 would tightly contact with outer wall surfaces of the two optical fiber inner tubes A, A' to effectively prevent liquid, insect or other foreign material from entering into the tubular body 10 via the outer ends of the receiving chambers 14, 15.

The purpose of the present invention is provide a simple optical fiber inner tube connector that could be handled in the simplest and most convenient manner to facilitate quick connection of two optical fiber inner tubes in an accurate, watertight and airtight manner, so that an optical fiber may be easily and smoothly extended through the connected optical fiber inner tubes.

It is apparent that although the present invention is illustrated with the description of the preferred embodiments, it is contemplated that there may be changes and modifications in the described embodiments that can be carried out without departing from the scope of the invention which is intended to be limited only by the appended claims.

What is claimed is:

1. An optical fiber inner tube connector, comprising a tubular body defining an inner space which is divided into two receiving chambers by at least an annular rib extended around an inner wall surface of, said tubular body; and each of said receiving chambers being located along said inner wall surface with a spirally extended thread starting from one side near outer end of said tubular body and ending at another side near said annular rib, and at least one circumferentially extended engaging tooth located in a portion of said inner wall surface between said annular rib and an end of said thread; whereby two optical fiber inner tubes that are to be connected to each other by the connector can be screwed into said two receiving chambers via two ends of said tubular body, so that said engaging teeth can tightly engage into outer wall surfaces of said two optical fiber inner tubes around inner ends thereof for said two optical fiber inner tubes to accurately align the tubes with each other and firmly locate the tubes in said connector.

2. An optical fiber inner tube connector as claimed in claim 1, wherein said threads in said two receiving chambers of said tubular body spirally extend in opposite directions.

3. An optical fiber inner tube connector as claimed in claim 1, wherein said engaging teeth in said receiving chambers of said tubular body are not helical teeth and do not spirally extend.

4. An optical fiber inner tube connector as claimed in claim 1, wherein said engaging teeth in said receiving chambers of said tubular body have pitch and depth larger than that of said spiral threads.

5. An optical fiber inner tube connector as claimed in claim 3, wherein said engaging teeth in said receiving chambers of said tubular body have pitch and depth larger than that of said spiral threads.

6. An optical fiber inner tube connector as claimed in claim 1, wherein said tubular body is located around said inner wall surface near two ends of said tubular body with at least two waterstop seal rings.

7. An optical fiber inner tube connector as claimed in claim 1, wherein each of said two receiving chambers of said tubular body is located around a portion of said inner wall surface between said annular rib and the end of said spiral thread with a waterstop locating ring.

8. An optical fiber inner tube connector as claimed in claim 7, wherein said waterstop locating ring is made of a material with a predetermined flexibility to allow elastic deformation thereof.

9. An optical fiber inner tube connector as claimed in claim 7, wherein one side of each of said waterstop locating rings facing toward the end of said tubular body is a radially inward including annular surface.

10. An optical fiber inner tube connector as claimed in claim 7, wherein each of said waterstop locating rings is located along an inner peripheral surface and includes an annular groove to allow said waterstop locating rings to elastically deform under axial compression.

11. An optical fiber inner tube connector as claimed in claim 1, further comprising two waterstop sleeve members separately located around an outer wall surface of said tubular body near two ends thereof for covering two ends of said tubular body.

12. An optical fiber inner tube connector as claimed in claim 11, wherein said waterstop sleeve members are made of an elastically deformable material.

13. An optical fiber inner tube connector as claimed in claim 11, wherein said waterstop sleeve members located around said tubular body are foldable into multiple layers and are stretched to cover said two ends of said tubular body.

14. An optical fiber inner tube connector as claimed in claim 13, wherein every two adjacent layers of said waterstop sleeve members in said folded state have a clearance between them.

15. An optical fiber inner tube connector as claimed in claim 14, wherein said clearance between every two adjacent layers of said folded waterstop sleeve members is filled with lubricant.

16. An optical fiber inner tube connector as claimed in claim 15, wherein said lubricant filled in said clearance between every two adjacent layers of said folded waterstop sleeve members comprises talc powder.

17. An optical fiber inner tube connector, comprising a tubular body defining an inner space which is divided into first and second receiving chambers for respectively receiving first and second optical fiber inner tubes, the spaced being divided by at least an annular rib extending around an inner wall surface of said tubular body; the first of said receiving chambers being located along said inner wall surface and including (a) a spirally extending thread starting from a first side near an outer end of said tubular body and ending at a second side near said annular rib, and (b) at least one circumferentially extending engaging tooth located in a portion of said inner wall surface between said annular rib and an end of said thread; whereby the first optical fiber inner tube that can be received by the first chamber and connected to the second inner tube can be screwed into said first receiving chamber via the first end of said tubular body so that said at least one engaging tooth can tightly engage an outer wall surface of said first optical fiber inner tube around an inner end of the first tube.

18. The combination of claim 17, wherein said at least one engaging tooth of said tubular body is not a helical tooth and does not extend spirally.

19. The connector of claim 17 connected to the first and second optical fiber inner tubes in the first and second receiving chambers, said at least one engaging tooth tightly engage an outer wall surface of said first optical fiber inner tube around an inner end of the first tube.

20. The combination of claim 19 wherein said at least one engaging tooth of said tubular body is not a helical tooth and does not extend spirally.

21. The combination of claim 19 wherein the second chamber includes (a) another spirally extending thread starting from a first side near another outer end of said tubular body and ending at another second side near said annular rib, and (b) at least another circumferentially extending engaging tooth located in another portion of said inner wall surface between said annular rib and another end of said thread.

* * * * *